(12) United States Patent  
Dub

(10) Patent No.: US 6,305,524 B1
(45) Date of Patent: Oct. 23, 2001

(54) ELECTRONIC BULK FEEDER FOR SMALL ASSEMBLY COMPONENTS

(76) Inventor: Fridrickh Dub, 11211 Jeanes St., Philadelphia, PA (US) 19116

( * ) Notice: Subject to any disclaimer, the term of this patent is extended or adjusted under 35 U.S.C. 154(b) by 0 days.

(21) Appl. No.: 09/503,394

(22) Filed: Feb. 14, 2000

Related U.S. Application Data

(63) Continuation of application No. 09/021,517, filed on Feb. 10, 1998, now abandoned.

(51) Int. Cl.[7] .......................... B65G 47/14; B65G 47/24; B65G 27/22; B65G 27/00
(52) U.S. Cl. ........................ 198/396; 198/768; 198/771
(58) Field of Search .................... 198/396, 771, 198/768

(56) References Cited

U.S. PATENT DOCUMENTS

| | | | |
|---|---|---|---|
| 4,006,812 | * | 2/1977 | Everett ........................ 198/347 X |
| 4,138,009 | * | 2/1979 | Strong ........................... 198/396 |
| 4,401,203 | * | 8/1983 | McDonald et al. .......... 198/392 X |
| 4,678,073 | * | 7/1987 | Anderson et al. ............... 198/396 |
| 4,744,455 | * | 5/1988 | Dragotta et al. ............. 198/389 X |
| 5,044,487 | * | 9/1991 | Spatafora et al. ........... 198/392 X |
| 5,052,543 | * | 10/1991 | Hagan ........................ 198/387 X |
| 5,070,988 | * | 12/1991 | Konishi et al. ............... 198/380 X |
| 5,083,654 | * | 1/1992 | Nakajima et al. ............ 198/444 X |
| 5,826,698 | * | 10/1998 | Sawada ........................... 198/443 |

* cited by examiner

Primary Examiner—Christopher P. Ellis
Assistant Examiner—Kenneth W. Bower
(74) Attorney, Agent, or Firm—John R. Ewbank

(57) ABSTRACT

In a feeder supplying assembly components to another machine, an electronic control device monitors a horizontal buffer zone. Pulses of compressed gas are intermittently employed to lift components upon detecting the absence of a component in a portion of such buffer zone. The grooved chute member has a shape resembling the symbol for a square root after replacing the angles with curves. The stream of flowing components can be quite fast because components are directed to fall into the downsloping gathering portion of the grooved chute at an upper, middle, and lower portions. More rapid multi-stage alignment of components is expedited by a zone underneath a deflector and a transition zone, with an alignment passageway between such zones.

17 Claims, 8 Drawing Sheets

US 6,305,524 B1

ELECTRONIC BULK FEEDER FOR SMALL ASSEMBLY COMPONENTS

This application is a continuation of Ser. No. 09/021,517, filed Feb. 10, 1998, now abandoned.

BACKGROUND OF THE INVENTION

This invention relates to improvements in the apparatus for feeding assembly components from a bulk supply zone into a pick-up zone in which component can be picked up for transfer to another machine, such as a robotic assembly machine. The feeder of the present invention is useful for many varieties of machines. Conventional feeders usually are a part of the assembly machine for which they are designed, and cannot ordinarily be used in another environment. Conventional feeders usually have been activated by some operation of the robotic assembly machine. Convention feeders have generally advanced a component from the bulk to the pick-up position by gravity or gravity assisted by a belt, or vibration or a compressed gas.

In convention feeders, the component at the pick-up position has oftentimes been subjected to the pressure of a gravitationally flowing stream of components, thus making it more difficult for the robotic assembly machine to pick up the component by vacuum. Hence some feeder have included additional mechanisms for adequately individualizing a component for transfer to a pickup zone, thereby increasing the propensities for jamming and other malfunctions. Most feeders have been purely mechanical feeders lacking adequate communication systems for alerting the operator and/or the robotic assembly machine concerning the status of the feeding mechanism. Heretofore the stream of flowing components from the bottom of a hopper has been unsatisfactorily slow, thus limiting the practical speed at which the robotic assembly machine could function.

BRIEF SUMMARY OF INVENTION

The present invention features a horizontal buffer zone so that a plurality of components are normally maintained in a tubular buffer zone and disentangled from the pressure of the flow of the stream of components to such horizontal buffer zone. Compressed gas is employed in advancing a stream of components toward the buffer zone, but gas dissipation means are provided at and/or near the end of the buffer zone so that a leading component is merely nudged into the pickup station. In order to slow down the speed of a component while flowing through the buffer zone, appropriate venting means, such as a plurality of holes, permits more and more dissipation of some of the compressed gas as the component advances through the buffer zone toward such pickup station. The open-topped pick up station at the exit of the buffer zone receives a component which has been merely nudged out of the buffer zone. A hard stop prevents a component from being nudged beyond such hard stop. At least one, and usually a plurality of detection means, such as an optical switch, identify the moments when components are absent from various portions of the buffer zone. Signals from such detection means influence an electronic control means so that a pulse of compressed gas is released for advancing at least one component toward said buffer zone. Thus, the feeder consistently provides a component at the pickup station, ready for transfer to another machine such as a robotic assembly machine. The components flow from a bulk supply in a hopper to the buffer zone at a speed which is faster than for convention feeders.

Certain preferred embodiments of the invention include supplemental improvements. The components flow gravitationally from the bulk supply in a hopper through a gathering zone toward a curved portion of a grooved chute. Said gathering zone features a downsloping portion of said grooved chute. Particular attention is directed to an upsloping lift portion of such grooved chute and to the use of compressed gas for lifting one or more components for flow through an upper curved portion of such grooved chute into the horizontal buffer zone.

Thus the shape of the groove desirably has some resemblance to the symbol for a square root in which the angles are replaced by appropriate curves. Certain embodiments schedule components to fall into such groove at a plurality of zones, thereby permitting a flowing stream of components which is significantly faster than would be attainable if there were only a single zone in which, following the laws of probability, a component might fall gravitationally into such groove.

In some embodiments of the invention in which a groove has a shape resembling a curved square root symbol, and in which the downsloping portion of the path of the groove is at the downwardly sloping bottom of hopper, a flexible deflector is positioned near about half way down the sloping bottom of the hopper. Such flexible deflector can be yieldingly deflected to permit components to flow gravitationally into a zone underneath such deflector. Some of the components under such deflector can fall into the groove at one or more of the supplemental zones. Some embodiments of the invention include a jet permitting the deflector to be vibrated by a pulse of compressed gas when the control means stimulates and intermittent pulse of compressed gas. The vibration of the deflector also tumbles the bulk components in that portion of the hopper adjacent to such deflector. Some embodiments of the invention provide for a transition zone in which the walls direct partially aligned components to fall gravitationally into the groove, there being a passageway between the zone under the deflector and the transition zone for such partial alignment of components. Some embodiments of the invention include one of more dislodging jets positioned to direct the intermittent pulses of compressed gas to zones in which components might bridge in such a manner as to delay the flow of components toward the buffer zone. Some embodiments of the invention provide visual or other communication to another device and/or the operator.

DETAILED DESCRIPTION OF THE INVENTION

Figure 1:
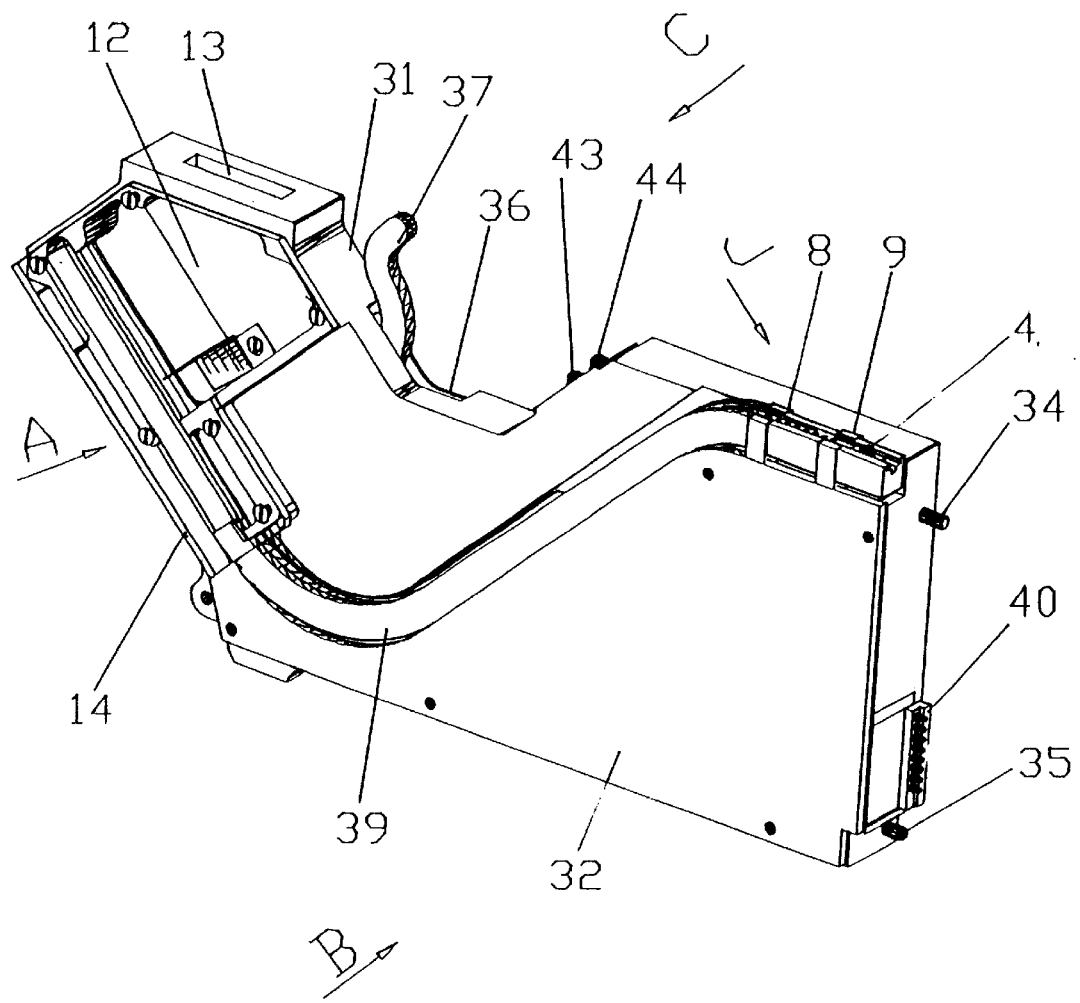
FIG. 1 is an isomeric view showing a feeder.
Figure 2:
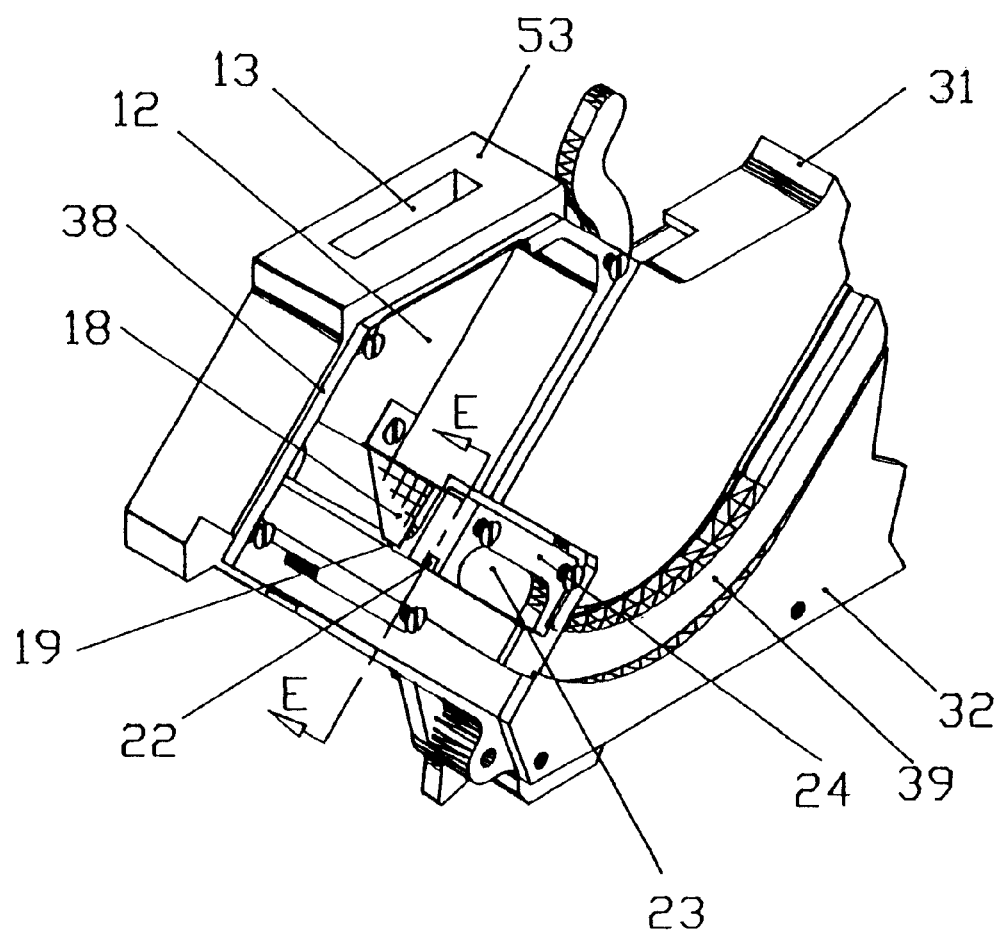
FIG. 2 is an enlargement of an isometric view, taken from a perspective on the left in FIG. 1.
Figure 3:
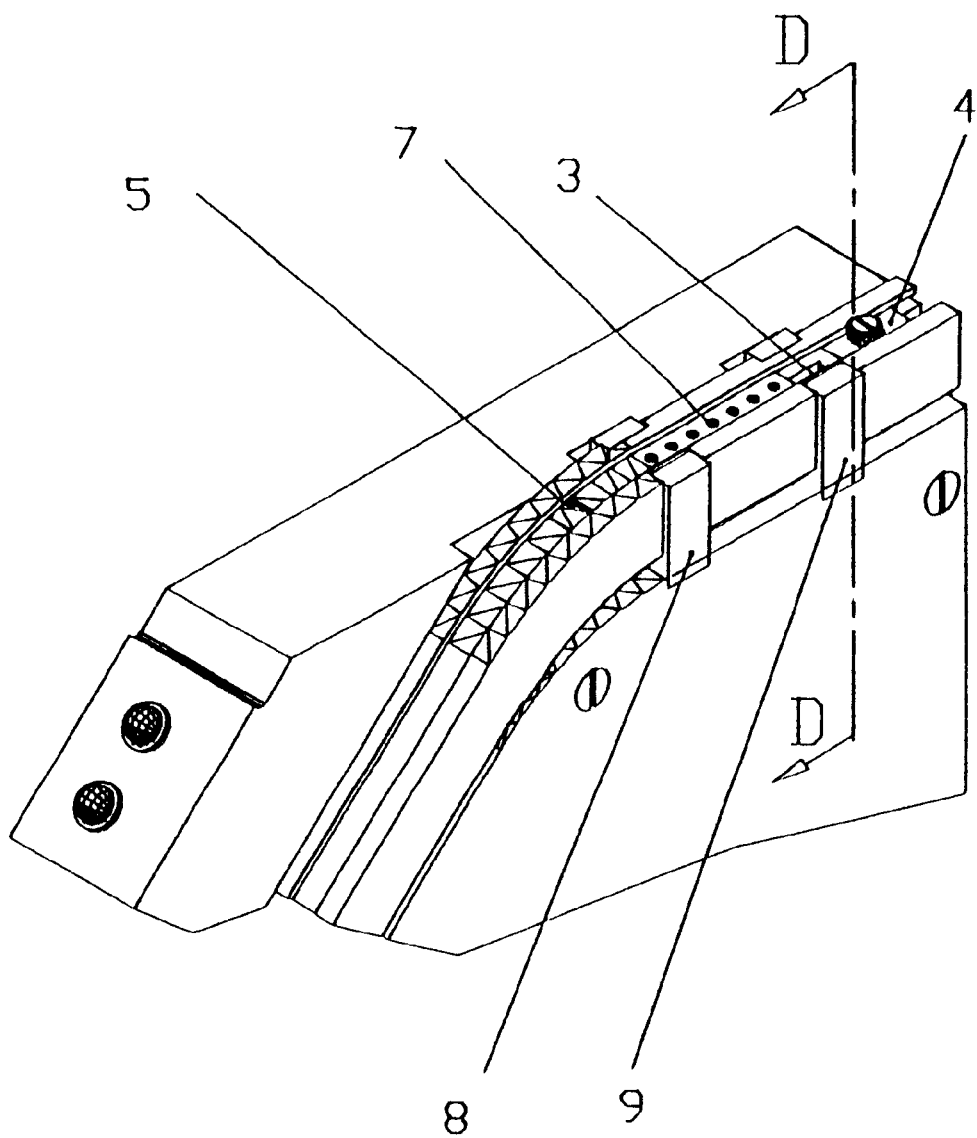
FIG. 3 is an enlargement of an isomeric view intended to show the top of the open-topped pick-up station.
Figure 4:
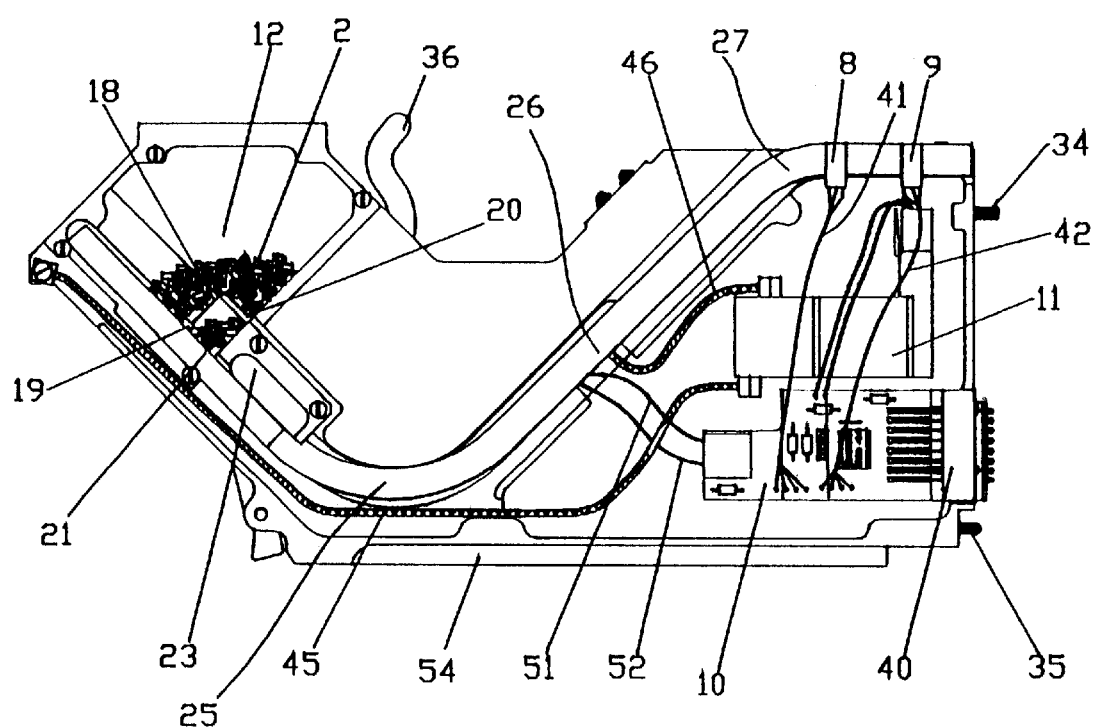
FIG. 4 is a view of the feeder after the removal of the covers.
Figure 5:
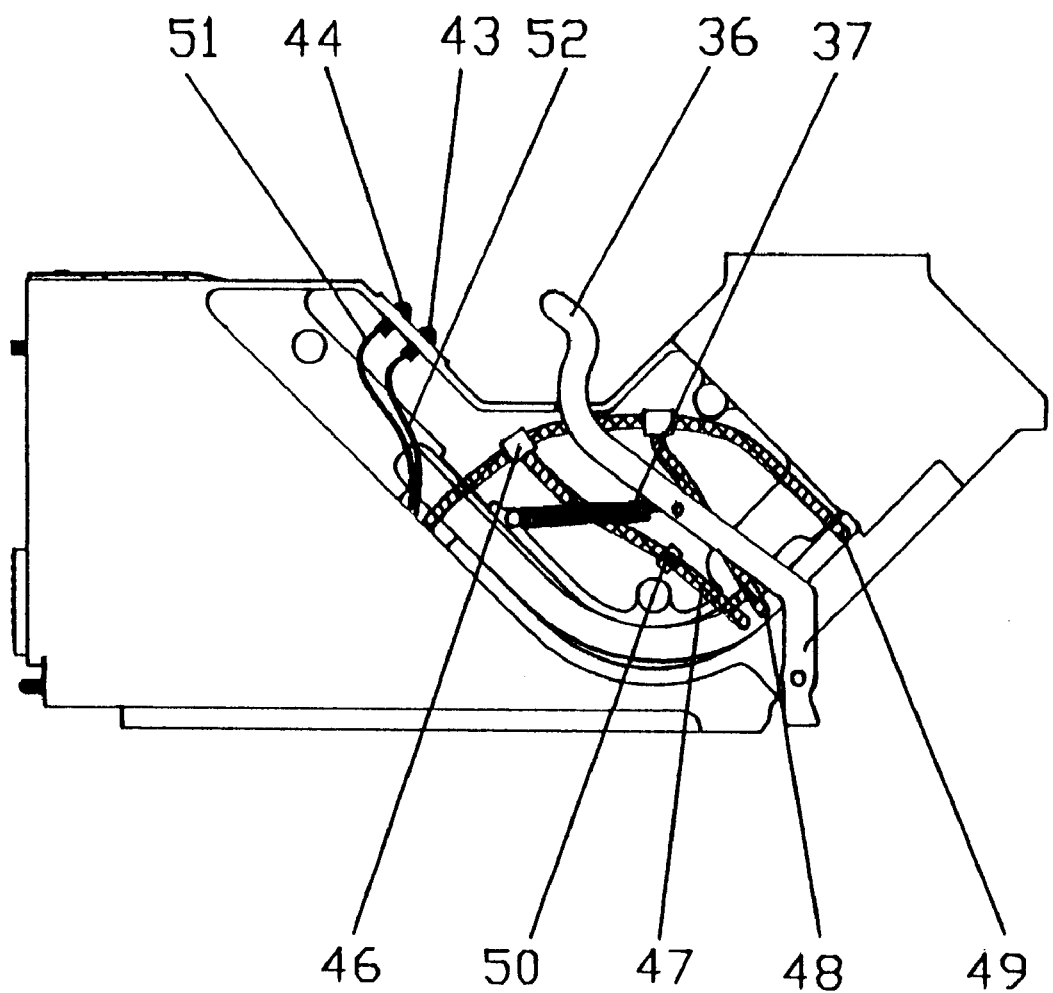
FIG. 5 is a back view of the feeder.
Figure 6:
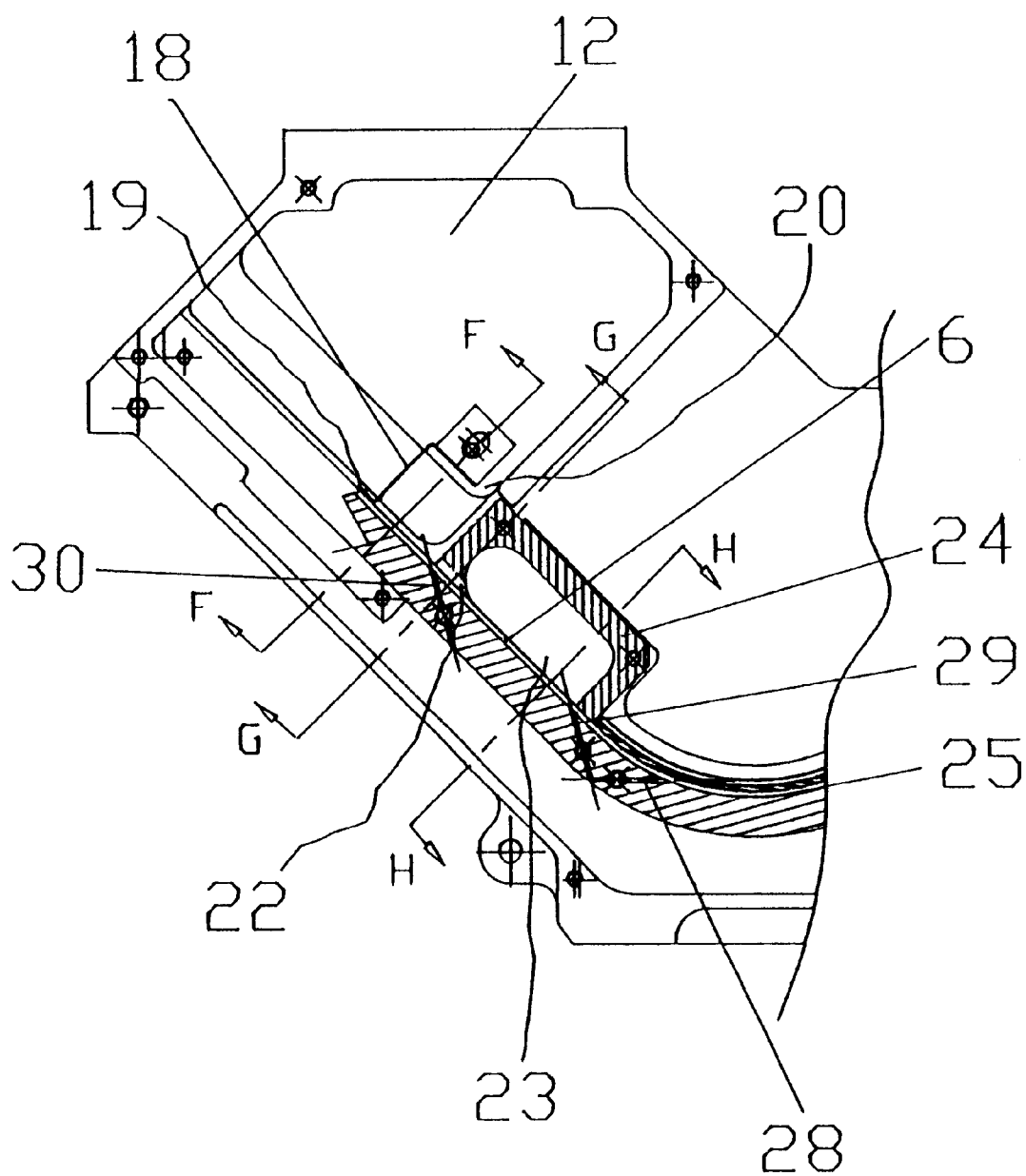
FIG. 6 is related to FIG. 2, which has arrows E—E indicating where the section view is taken, and is an enlarged partially-sectional of the left portion of FIG. 4.
Figure 7:
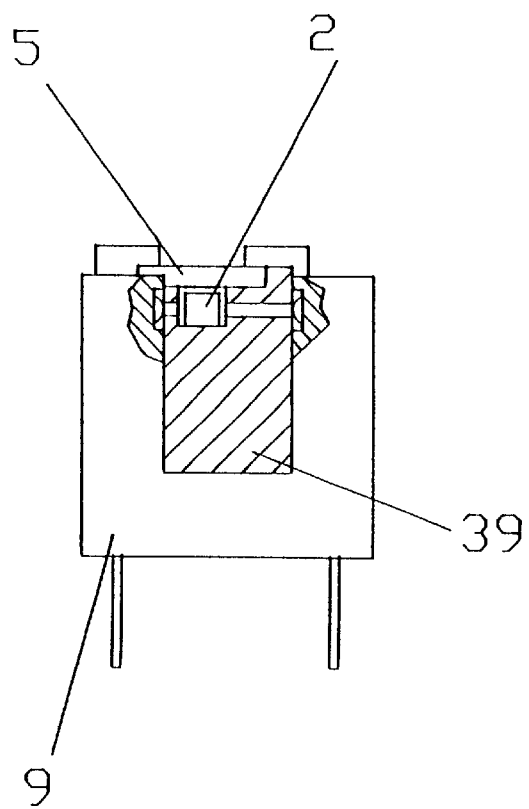
FIG. 7 is an enlarged view of Section D—D of FIG. 3.
Figure 8:
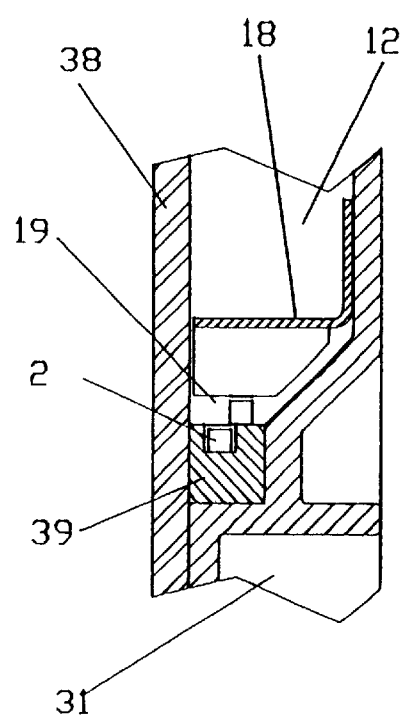
FIG. 8 is an enlarged view of Section F—F of FIG. 6.
Figure 9:
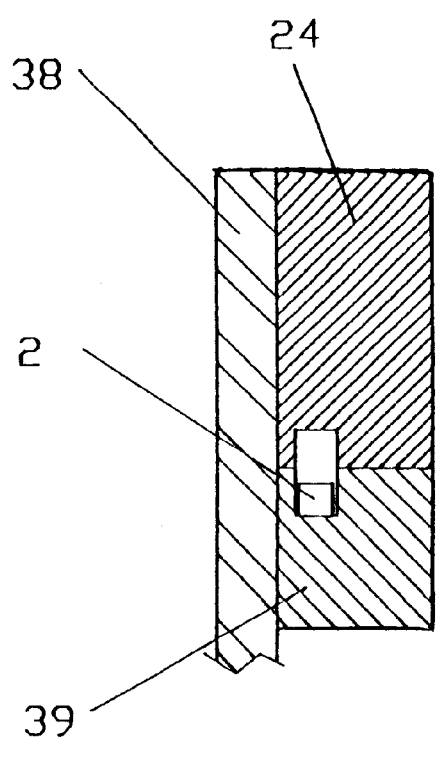
FIG. 9 is an enlarged view of Section G—G of FIG. 6.
Figure 10:
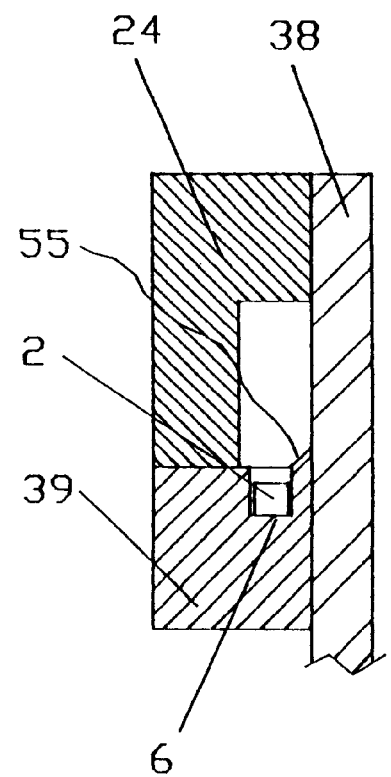
FIG. 10 is an enlarged view of Section H—H of FIG. 6.

One merely illustrative example of the invention is shown in FIGS. 1–10. A feeder includes a horizontal buffer zone from which a component 2 can be nudged onto a pickup station 3. A hard stop 4 halts a component 2 from going beyond such pickup station 3, which is open-topped. Hence the robotic assembly machine has access to a component at the pickup station 3. Because the pickup station 3 is open-topped, any residual gas pressure near the exit of the buffer zone is readily dissipated. The buffer one comprises a transparent cover 5 over a groove 6, thereby providing a tubular passageway for the flowing stream of components 2. Particular attention is directed to holes 7 permitting the dissipation of compressed gas as a component 2 is advanced through the buffer zone by one or more intermittent pulses of compressed gas. Desirably any dissipation means is increasingly effective as a component 2 flows through the buffer zone for increasingly decelerating the speed of the component 2. Ordinarily, the compressed gas is compressed air. The stream of components 2 is advanced toward the pickup station 3 by one or more intermittent pulses of compressed gas. Some gas pressure is dissipated through holes 7, thereby slowing down each component 2 so that the leading component 2 is merely nudged out of the tubular buffer zone onto the pickup station 3. The pickup zone 3 is open-topped, thus effectively dissipating any residual gas pressure.

The feeder is designed so that the control of the intermittent pulses of compressed gas is affected by the situation is the buffer zone. Suitable detection means such as optical switches 8 and 9 are actuated to send signals to an electronic control device 10 whenever the absence of a component 2 is detected by such optical switches 8,9. The electronic control device 10 actuates a valve 11 controlling when there should be the intermittent pulses of compressed gas. Said valve 11 is ordinarily a solenoid valve for ease of electronic control of such pulses.

In the operation of the feeder, the intermittent pulses of compressed gas provides an assuredly reliable but somewhat intermittent stream of components 2 to the buffer zone because the intermittent pulses of compressed gas urge a component 2 into and through a portion of the buffer zone, and then nudge the leading component 2 onto the pick-up station 3. Upon the detection of the absence of a component at the light switches 8 and/or 9, the valve 11 is momentarily opened to send another pulse of compressed gas, which gets dissipated through the holes 7 in the transparent cover 5, and through the open-topped pick-up station 3.

The feeder comprises a hopper 12 into which the bulk components 2 can be poured through window 13. At the bottom of the hopper 12 is a gathering zone of the open-topped groove 6 which slopes downwardly so that whenever a component 2 falls into the groove 6, it will flow gravitationally in the grove 6, along its downward slope. The gathering zone of such downward slope is divided into an upper zone, a middle zone, and a lower zone. In order to enhance the potential speed of flow of components 2 through the buffer zone, the feeder supplies components 2 for falling into such groove 6 in the upper, middle, and lower zones of the gathering zone. The bulk components 2 in the hopper 12 are randomly oriented. The law of probabilities indicates that only a small fraction of the bulk components will happen to be so oriented as to fall directly into open groove 6 in the upper portion of the gathering zone. The pressure of the bulk components above any zone tends to stabilize their orientations. Hence many of the components 2 in the hopper 12 above the upper portion of the gathering zone will fail to align properly for falling into groove 6. Particular attention is directed to a flexible deflector 18 having a general L shape, so that when the deflector 18 is flexed, its two edges are flexed above the bottom of the hopper 12, permitting components 2 to flow gravitationally through openings 19, 20. Thus a group of components 2 can flow into a zone 21 under the deflector 18. Such components 2 in zone 21 under the deflector 18 differ from components in the main bulk supply in the hopper 12, and are not subjected to as much weight from components 2 thereabove. Such components 2 in the zone 21 underneath the deflector 18 have greater freedom from reorienting while flowing gravitationally. Some of the components 2 in such zone 21 under the deflector 18 can fall into the groove 6 in the middle portion of the gathering zone. Some of the components 2 in such zone 21 under the deflector 18 can flow gravitationally through an aligning passageway 22 into a transitions zone 23 of housing insert 24. Some of the components 2 in the transsition zone 23, having been partially aligned correctly by the aligning passageway 22 are further aligned by surfaces such as a sloping surface 55 in the transition zone 23 so that they are aligned to fall into the groove 6 in the lower portion of the gathering zone. Thus it is feasible to apply the laws of probability to direct randomly oriented bulk components 2 in the hopper 12 into a plurality of portions of the downsloping groove 6 for a relatively fast-flowing stream of components 2.

The components 2 flow gravitationally to a lower curved portion 25 of the grove 6, and are lifted through an upwardly sloping lifting portion 26 of the groove 6. An upper curved portion 27 of the groove 6 directs the flow of components 2 from such upwardly sloping lifting portion 26 to the rear of the tubular buffer zone. A gas jet 28 intermittently directs a pulse of compressed gas to lift either a single component 2 or a stream of components 2 up the sloping lift zone 26 and through the upper curved zone 27 into and, with appropriate deceleration, through the buffer zone 1.

Randomly oriented components 2 can bridge zones in such a manner as to impair the rapid flow of components toward the buffer zone. A gas jet 29 sends a dislodging pulse of compressed gas into the transition zone 23 to terminate any bridging in the transition zone 23. Gas jet 30 directs a gas jet into the zone 21 under the deflector 18 for vibrating the deflector 18, thereby providing gentle tumbling of the that portion of the hopper contents above the deflector 18 without requiring significant consumption of power and without excessive abrasion of the components 2 by such gently tumbling.

In the operation of the feeder, bulk components 2 are poured into the hopper 12. Some components 2 fall into groove 6 in an upper portion of the gathering zone. Some components 2 flow into the zone 21 underneath the deflector 18 when the deflector 18 is vibrated by an intermittent pulse of gas from jet 30. Some of the components 2 flow from zone 21 into groove 6 in a middle portion of gathering zone. Some of the components 2 in the zone 21 under the deflector 18 flow through an aligning passageway 22, thereby being partially aligned into transitional zone 23, where the surfaces urge components 2 to fall into groove 6 into the lower portion 17 of the gathering zone 14. Such alignment techniques provided a greater probability that a component in the transition zone will fall into grove 6 than the small probability that a component would fall into the same length of the upper portion of groove 6.

The stream of components 2 flows gravitationally from gathering zone to the lower curved zone 25 of said grooved chute 6. A pulse of compressed gas is directed through the lifting jet jet 28 for lifting one or a stream of components 2 up an upwardly sloping lifting zone 26 of groove 6 and through an upper curved zone 27 into the rear of the horizontal buffer zone Gas is dissipated, desirably at an increasing rate, as one of the components flows through the buffer zone 1, so that the component 2 is nudged onto the pickup station 3 where the component is halted by a hard stop 4, which is optionally adjustable. After a light switch 8 or 9 has detected the absence of a component 2, the signal is sent to the electronic control device 10 which activates valve 11 to send another pulse of compressed gas. Such pulse of compressed gas is directed to three jets, including said lifting jet 28, dislodging jet 29, and deflector vibrating jet 30. After understanding the method, comprehending the hardware is easier.

The feeder includes a housing 31, a front cover 32, and a rear cover 33. The feeder has appropriate means for securing the feeder to a companion machine such as a robotic assembly machine. A dowel pin 34 and a pin with a spherical head 35 and a rib 54 collaborate with a lever 36 and a spring 37 in positioning the feeder on the machine. The hopper 12 has a loading window 13 and front and rear covers 38 which are transparent. The groove 6 is in a chute-foundation 39, which has the downsloping gathering portion, the lower curved portion 25, the upsloping lift portion 26, the upper curved portion 27, and the horizontal buffer zone portion. The chute-foundation 38 has a general shape with some resemblance to the square root symbol in which the two angles are modified into curves having a radius of curvature permitting the flow of components 2.

At the exit end of the feeder is an electrical connector 40 which can be energized by an appropriate source of 12 volt DC current. Electrical leads 41,42 connect the optical switches 8, 9, with the electronic control device 10. A red LED 43 and a green LED 44 are actuated by the electronic control device 10 in response to signals from the optical switches 8,9, so that an operator can determine the status of the feeder. Compressed gas is supplied to the solenoid valve 11 through hose 45. A hose 46 directs compressed gas from solenoid valve 11 to the three hoses, 47, 48, and 49 which supply intermittent pulses of compressed gas to jets 28, 29, 30, respectively. One or more of the hoses can have an adjusting valve, as shown by valve 50 on hose 47 for the lifting gas jet 28.

2 component
3 pickup station
4 not used
5 transparent cover
6 groove
7 holes in transparent cover
8 rear optical switch
9 forward optical switch
10 electronic control device
11 solenoid valve
12 hopper
13 window to pour bulk into hopper
14 not used
15 not used
16 not used
17 not used
18 deflector
19 opening under edge of 18
20 opening under another edge of 18
21 zone underneath deflector 18
22 aligning passageway between 21 & 23
23 zone within housing insert
24 housing insert
25 lower curved portion of 6
26 upwardly sloping lift portion of 6
27 upper curved portion of 6
28 gas jet for lifting through 26 and 27
29 gas jet for dislodging in 23
30 gas jet for vibrating deflector 18
31 housing for feeder
32 front cover of housing
33 rear cover of housing
34 dowel pin
35 pin with spherical head
36 lever for mounting feeder
37 spring for lever 36
38 side-covers for hopper 12
39 chute-foundation having groove 6
40 electrical connector
41 electrical wire from 8 to 10
42 electrical wire from 9 to 10
43 red LED
44 green LED
45 hose supplying compressed gas to valve 11
46 hose from 11 to three hoses 47,48,49
47 hose to 28 for lifting components through 26
48 hose to gas jet 29 for dislodging components in 23
49 hose to gas jet 30 for vibrating deflector 18
50 adjusting valve 50
51 not used
52 not used
53 not used
54 rib for mounting feeder

The invention claimed is:
1. An electronically controlled apparatus for feeding bulk small assembly components into an assembly machine comprising:
   a cast housing that supports a plurality of main functional components of the apparatus;
   a cavity-hopper for loading and storing a plurality of assembly components;
   a chute lying at the bottom of the hopper the chute further comprising a groove on the top surface;
   a deflector located in the lower part of the hopper, the deflector is made out of thin sheet metal;
   a housing insert which defines a second stage of alignment;
   a chute cover made of clear plastic which allows viewing of moving components;
   an adjustable hard stop for positioning assembly components before the components are picked up;
   an air jet nearby a passage from the hopper to the housing insert, the air jet is blow away the components which are obstructing the passage;
   a second air jet nearby a second passage comprising the groove of the chute covered the second air jet blows away the components which are obstructing this passage;
   a third air jet to move the assembly of components along the groove in the chute;
   a photoelectric switch located at the pickup position;
   a second photoelectric switch located before pickup position, in the end of the buffer;
   a solenoid valve;
   an electrical connector power supply and communication with assembly machine controls;
   a printed circuit board for electronic control;
   a plurality of hoses for individual air supply to each of the three air jets; and
   a restriction valve to control the air flow for moving the components along the chute.

2. An apparatus for feeding small assembly components to a pickup station comprising:

a substantially horizontal buffer zone normally containing a plurality of components scheduled to be delivered to such pickup station;

said components normally being isolated from the pressure of any advancing stream of components;

an electronic control device;

a valve controlling the intermittent pulses of compressed gas;

detection means near said pickup station sending a signal to the electronic control device whenever the absence of a component is detected, said electronic control device actuating said valve to send a pulse of compressed gas of controlled duration upon such detection of an absence of a component;

an advancing gas jet means for at least partially advancing the flow of components through said buffer zone; and gas dissipation means adapted increasingly to decelerate a component during its flow through said buffer zone;

whereby a component is nudged from the exit of said buffer zone onto said pickup station.

3. The apparatus for feeding small assembly components to a pickup station of claim 2 further comprising:

a hopper for containing a bulk supply of small assembly components;

a grooved chute having a downwardly sloping portion, an upwardly sloping portion, a lower curved portion connecting the downwardly sloping portion with the upwardly sloping portion, and an upper curved portion connecting the upwardly sloping portion with said substantially horizontal buffer zone, said downwardly sloping portion receiving appropriately aligned components flowing from the bulk supply in said hopper, said gas jet means being in the lower curved portion so that a pulse of compressed gas lifts at least one component up said upwardly sloping portion of said groove chute.

4. The apparatus for feeding small assembly components to a pickup-station of claim 2 further comprising:

means guiding components to fall into said grooved chute in the upper portion, middle portion, and lower portion of said downwardly sloping grooved chute.

5. The apparatus for feeding small assembly components to a pickup station of claim 2 further comprising:

a deflector which can be flexed to permit a small number of small assembly components to be underneath such deflector for flow to said middle portion of said downsloping portion of said grooved chute.

6. The apparatus for feeding small assembly components to a pickup stations of claim 2 which comprises:

a body insert defining a transition zone having surfaces urging components to flow to said lower portion of said downsloping portion of said grooved chute;

an aligning passageway between said zone underneath the deflector and said transition zone, whereby component are partially aligned while going through said aligning passageway.

7. The apparatus for feeding small assembly components to a pickup station of claim 2 which comprises:

a vibrating jet directing intermittently a pulse of compressed gas for vibrating said deflector;

a dislodging jet directing intermittently a pulse of compressed gas into the transition zone for dislodging any components interfering with the flow of components toward said grooved chute.

8. The apparatus for feeding small assembly components to a pickup station, of claim 2 which comprises:

a visual display actuated by the electronic control device to alert an operator about the presence or absence of a component near the pickup station.

9. The apparatus for feeding small assembly components to a pickup station of claim 2 which comprises:

a hopper for containing a bulk supply of small assembly components;

a grooved chute having a downwardly sloping portion, an upwardly sloping portion, and a lower curved portion connecting the downwardly sloping portion with the upwardly sloping portion, and an upper curved portion connection said upwardly sloping portion with said substantially horizontal buffer zone, said downwardly sloping portion receiving approximately aligned components flowing from the bulk supply in said hopper, said gas jet means for lifting a component up the upwardly sloping portion being in the lower curved portion so that a pulse of compressed gas lifts at least one component up said upwardly sloping portion of said chute;

means guiding components to fall into said grooved chute in the upper portion, middle portion, and lower portion of said downwardly sloping grooved chute;

a deflector which can be flexed to permit a small number of small assembly components to be underneath said deflector for flow to said middle portion of said downsloping portion of said grooved chute;

a body insert defining a transition zone having surfaces urging components to flow to said lower portion of said downwardly sloping portion of said grooved chute;

an aligning passageway between said zone underneath said deflector and said body insert, whereby components are partially aligned while going through said aligning passageway;

a vibrating jet directing intermittently a pulse of compressed gas for vibrating said deflector;

a dislodging jet directing intermittently a pulse of compressed gas into the transition zone for dislodging any components interfering with the flow of components toward said grooved chute; and a visual display actuated by said electron control device to alert an operator about the presence or absence of a component near said pickup station.

10. An apparatus for feeding bulk small assembly components to a pickup zone for use in other apparatus comprising:

a substantially horizontal buffer zone adapted to accommodate a plurality of components flowing in a covered groove of a chute member, the outlet from said buffer zone serving as dissipating means for pressurized gas, there being increasing capacity for dissipation of gas as a component advances through the buffer zone so that pressurized gas in dissipated for slowing down the speed of an advancing component;

a pick-up zone comprising a hard stop member so that a component can be available for pick-up in such pick-up zone after being urged to flow through said buffer zone by at least one intermittent pulse of gas so that the component stops at said hard stop member;

at least one detection means in a said buffer zone adapted to send a signal when a component is absent from such portion of the buffer zone;

a valve means controlling said intermittent pulses of gas pressure control means actuating said valve means to send a pulse of gas pressure whenever a signal is received from said detection means, whereby the pulses of compressed gas maintain a plurality of components in the buffer zone, thus assuring the availability of a component at the pickup zone;

at least one jet directing pulses of compressed gas intermittently from said valve means for urging flow of at least one component toward said buffer zone and a hopper containing a bulk supply of said components for gravitational flow toward a zone in which components are urged to flow by said intermittent pulses of pressurized gas toward and through said buffer zone.

11. An apparatus for feeding small assembly zone to a pick up zone comprising:

a downwardly sloping gathering portion of said grooved chute at the bottom of said hopper adapted to permit components to flow into portions of said chute at least partially by gravitational force;

a curved bottom most portion of said grooved chute accommodating components from said downwardly sloping gathering portion an upwardly sloping lift portion of said grooved chute connecting said curved bottom most portion of said grooved chute with an upper curved portion of said grooved chute for delivering components to the rear portion of said buffer zone;

jet means directing a pulse of compressed gas for lifting at least one component up said upwardly sloping lift portion to said horizontal buffer zone;

said control means being electronic control means responsive to electrical signals generated by said detection means;

some of the components in the hopper falling into an upper portion of the grooved chute member, some of the components falling into a middle portion of the grooved chute member, and some of the components falling into a lower portion of the sloping gathering portion of the grooved chute member;

a deflector adapted to yieldingly permit a group of components to flow from the bulk zone of the hopper into a zone underneath such deflector;

guiding means in said zone underneath the deflector directing some of said components to fall into said middle portion of said grooved chute member;

guiding means in said zone underneath the deflector directing some of said components to flow through at least one aligning passageway so that some components can fall into said lower portion of the downwardly sloping gathering portion of the grooved chute member;

a jet directing a pulse of compressed gas for vibrating said deflector;

a jet directing a pulse of compressed gas upwardly for dislodging any components mis-aligned near such jet;

a plurality of detection means for various portions of said buffer zone, said control means actuating the valve means whenever the absence of a component is detected in any of said portions of the buffer zone; and at least one visual display alerting an operator about the presence or absence of components in portions of the buffer zone.

12. An apparatus for feeding small assembly components in accordance with claim 10, further comprising:

a downwardly sloping gathering portion of said grooved chute at the bottom of said hopper adapted to permit components to flow into that portion of said chute at least partially by gravitational force;

a curved bottom most portion of said grooved chute so that the components from said sloping gathering portion of said grooved chute flow into said curved bottom most portion of said grooved chute;

an upwardly sloping lift portion of said grooved chute connecting said curved bottom most portion of said grooved chute with an upper curved portion of said grooved chute for delivering components to the rear portion of said buffer zone; and said jet means directs a pulse of compressed gas for lifting at least one component up said sloping lift portion to said horizontal buffer zone.

13. An apparatus for feeding small assembly components in accordance with claim 10 further comprising:

said valve is a solenoid valve and said control means are an electronic control means responsive to electrical signals generated by said detection means.

14. An apparatus for feeding small assembly components in accordance with claim 10, further comprising:

some of the components in the hopper fall into an upper portion of said downwardly sloping gathering portion of said grooved chute, other components fall into a middle portion of said sloping gathering portion of said grooved chute, and other components fall into lower portions of said downwardly sloping gathering portion of said grooved chute.

15. An apparatus for feeding small assembly components in accord accordance with claim 10, further comprising:

a deflector yieldingly adapted to permit a small group of components to flow from near the bottom of the hopper toward a one underneath said deflector in which zone some of said components can fall into a middle portion of said grooved chute, guiding-means directing some of the components in said zone underneath said deflector to flow gravitationally through at least one alignment passageway prior to falling into said lower portion of said downwardly sloping gathering portion of said grooved chute.

16. An apparatus for feeding small assembly components in accordance with claim 10 further comprising:

a jet directing a pulse of compressed gas for vibrating said deflector;

a jet directing a pulse of compressed gas upwardly for dislodging any mis-aligned components; and a jet directing a pulse of compressed gas for lifting at least one component up the upwardly sloping portion of the grooved chute.

17. An apparatus for feeding small assembly components in accordance with claim 10 further comprising:

a plurality of detection means at various portions of said buffer zone, said control means being an electronic control means actuating a solenoid valve whenever the absence of a component is detected by any of said detection means; and a visual display alerting an operator about the presence or absence of a component in portions of the buffer zone.

* * * * *